United States Patent [19]
LaFollette et al.

[11] 3,946,841
[45] Mar. 30, 1976

[54] SHIFT MECHANISM FOR A MARINE CLUTCH

[75] Inventors: Robert L. LaFollette, Baldwinsville; Kenneth H. Miller, Syracuse, both of N.Y.

[73] Assignee: American Challenger Corporation, Fulton, N.Y.

[22] Filed: July 17, 1974

[21] Appl. No.: 489,365

[52] U.S. Cl. .................... 192/35; 192/21; 192/65; 192/94; 74/333; 74/378
[51] Int. Cl. ..... F16d 21/04; F16h 3/08; F16d 23/00
[58] Field of Search .............. 192/21, 35, 48.91, 51, 192/65, 94; 74/333, 377, 378

[56] References Cited
UNITED STATES PATENTS

| | | | |
|---|---|---|---|
| 1,355,152 | 10/1920 | Laird | 74/378 X |
| 1,414,622 | 5/1922 | Carter | 192/21 X |
| 1,430,627 | 10/1922 | Cleland | 192/94 X |
| 2,735,528 | 2/1956 | Dodge | 192/48.91 |
| 2,795,964 | 6/1957 | Short | 192/48.91 X |
| 3,212,349 | 12/1973 | Bergstedt | 74/378 |
| 3,901,361 | 8/1975 | Brownlie | 192/21 |

Primary Examiner—Samuel Scott
Assistant Examiner—Lance W. Chandler
Attorney, Agent, or Firm—Woodcock, Washburn, Kurtz & Mackiewicz

[57] ABSTRACT

A clutch mechanism includes forward and reverse driving gears rotatably mounted on the input shaft which has first and second oppositely threaded driving spiral threads thereon. First and second clutch elements threadedly engage the spiral threads on the input shaft. In the neutral position, the clutch elements rotate with the input shaft but when rotation is impeded, the spiral threads drive the clutch elements axially into engagement with the driving gears. An improved shift mechanism includes a yoke having two legs which extend over flanges on the clutch elements. A pin member moves the clutch elements upon axial movement of the shift linkage. Drag is provided for the yoke so that the flange of the clutch element is pinched between the pin member and the yoke to impede rotation of the clutch element. The shift mechanism engages and disengages the clutch smoothly and with the engine torque providing most of the force required for engagement and disengagement.

6 Claims, 3 Drawing Figures

SHIFT MECHANISM FOR A MARINE CLUTCH

BACKGROUND OF THE INVENTION

This invention relates to an improved shifting mechanism for a marine clutch.

In marine drives, both dog and friction clutches have been employed. Dog clutches operate with a jerk when engaged, particularly when the engine speed is high. Friction clutches require a considerable amount of power for actuation and are not well suited to remote control.

U.S. Pat. No. 3,212,349 Bergstedt shows the use of a cone clutch in a marine drive. This cone clutch has the advantage that there is a natural force driving the two mating clutch surfaces into engagement, one with the other. While engagement is good in the Bergstedt clutch mechanism, disengagement is a problem. The Bergstedt mechanism uses a disengagement arrangement whereby the mating cone clutch surfaces are literally hammered out of engagement one with the other. This arrangement is subject to malfunction.

The shift mechanism of this invention is for use in conjunction with the clutch claimed in U.S. Pat. No. 3,901,361 Brownlie. The shift mechanism and clutch are applicable to and can be used in the marine drive fully described in copending application Ser. No. 416,228, filed Nov. 15, 1973, abandoned in favor of continuation application Ser. No. 574,620, filed May 5, 1975.

SUMMARY OF THE INVENTION

In accordance with this invention, a shifting mechanism for a marine cone clutch operates in a manner such that only slight force of the shift linkage is required to initiate a shifting action and the principal engagement and disengagement force is provided by the engine torque.

It is an important object of this invention to provide a shift mechanism for a marine clutch which easily engages and disengages the clutch.

More particularly, the shifting mechanism includes a yoke having two legs extending over flanges on two cone clutch elements. In accordance with an important aspect of the invention, drag is provided on the yoke so it is not completely free for axial movement. Because of this, upon axial movement of the shift linkage, the flange on a clutch element is pinched between a member which is moved axially and a leg of the yoke. This slows down rotation of the clutch element and the spiral threads drive the clutch element axially into engagement. To disengage the clutch, the opposite axial movement of the shift linkage pinches the flange on the other clutch element between the member and the other leg of the yoke. This slows down rotation of the other clutch element and movement in the opposite axial direction is affected by the spiral threads to disengage the clutch.

The foregoing and other objects, features and advantages of the invention will be better understood from the following more detailed description and appended claims.

DESCRIPTION OF THE PREFERRED EMBODIMENT

Figure 1:
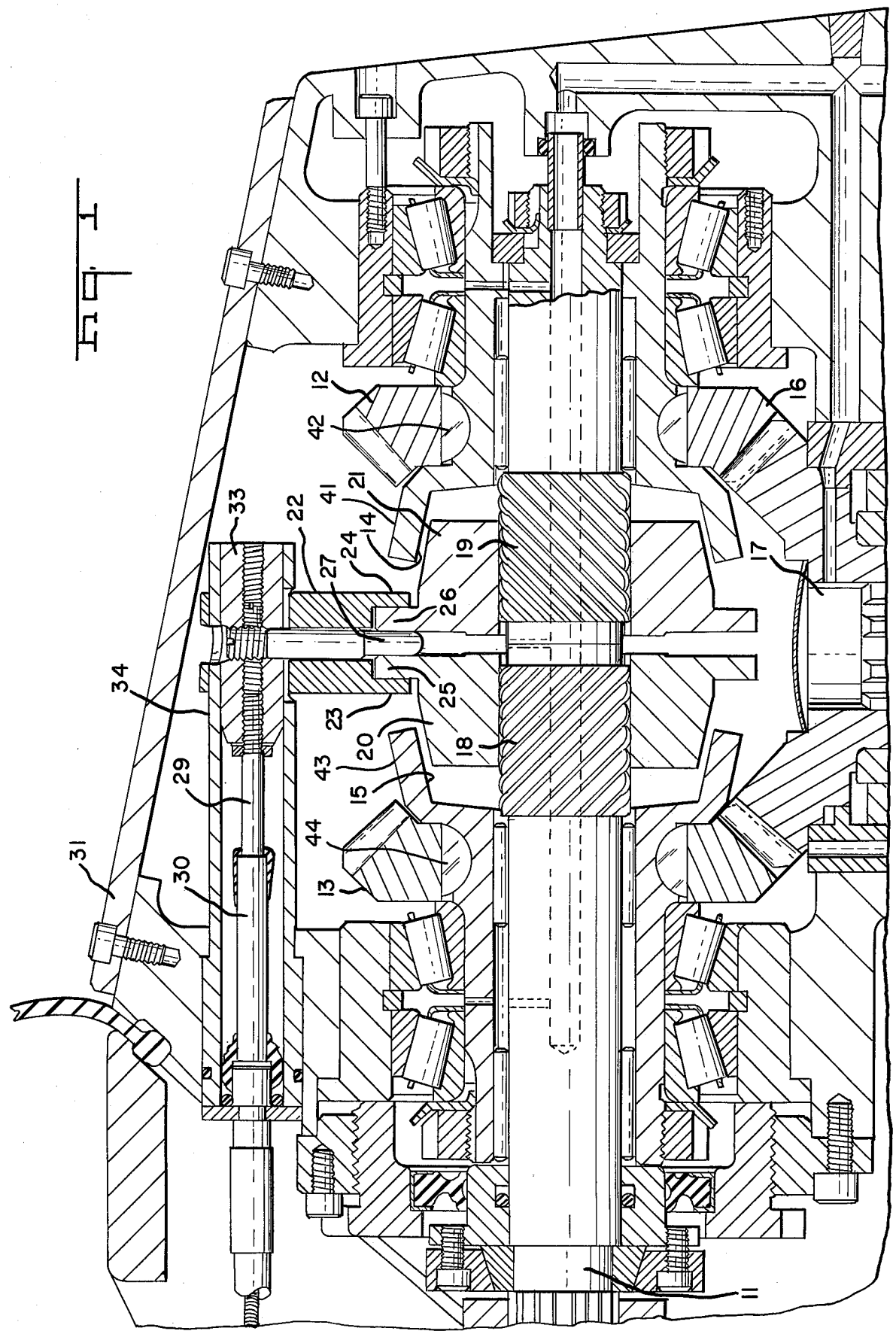
FIG. 1 is a cross-section through the clutch and shifting mechanism.

First, consider the clutch mechanism which is the subject of the copending Brownlie application. The clutch mechanism includes an input shaft 11 which is connected to the marine engine. Bevelled forward driving gear 12 and bevelled reverse driving gear 13 rotate on the input shaft 11. Forward gear 12 has a cone clutch surface 14 and reverse gear 13 has a cone clutch surface 15.

Gears 12 and 13 engage an output gear 16 which is affixed to the output shaft 17. The shaft 17 is connected to a marine propulsion unit, usually a propeller. The details of the connection between the output shaft and the propeller are more fully shown in the aforesaid Brownlie patent application. In the neutral position, the output shaft 17 and the engaged gears 12, 13 and 16 do not rotate.

The input shaft 11 has a right hand spiral thread 18 and a left hand spiral thread 19. Clutch element 20 has, on the inner surface thereof, a right hand spiral thread which matches that of the spiral thread 18. Clutch element 21 has a left hand spiral thread which matches that of the spiral thread 19. Clutch element 20 has a clutch surface which mates with the clutch surface 15. Clutch element 21 has a cone clutch surface which mates with the surface 14.

In the neutral position, both clutch elements 20 and 21 rotate with the input shaft 11.

The shifting mechanism includes a yoke 22 which has legs 23 and 24. Clutch element 20 has a flange 25 and clutch element 21 has a flange 26. The two legs of the yoke extend over the flanges so that the clutch elements 20 and 21 move together axially. A pin member 27 is moved axially by a shift linkage. The shift linkage includes cable 29 which is movable in the sheath 30. The sheath 30 is affixed to the casing 31 by a cable lock. The cable 29 is screwed into a shifting guide 33. The guide 33 moves in the guide tube 34.

Figure 2:
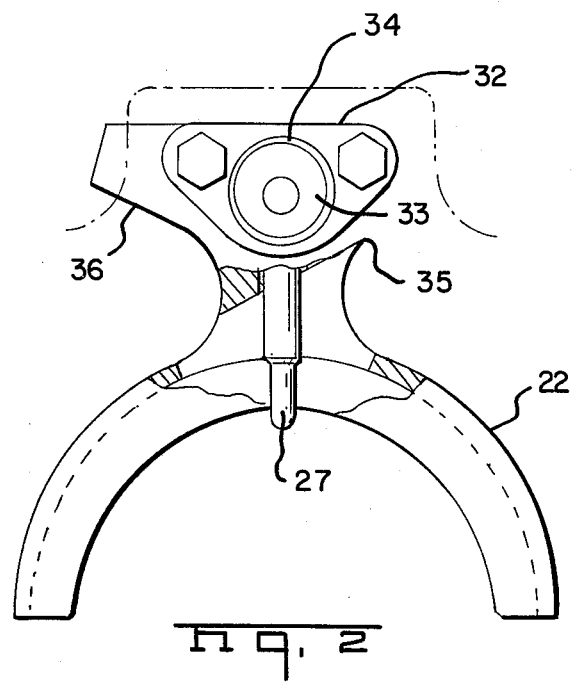
FIG. 2 is an end view of the yoke.
Figure 3:
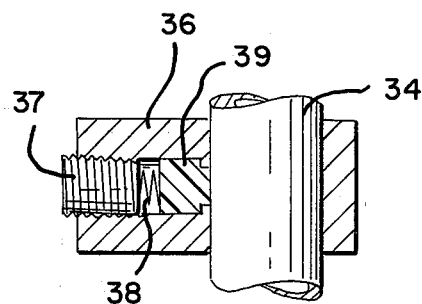
FIG. 3 shows the details of the frictional device providing drag on the yoke.

As best shown in FIG. 2, the yoke is semi-circular and it has an upper portion 35. Guide tube 34 passes through a hole in the upper portion of the yoke so that the yoke can ride axially along the guide tube. The upper portion 35 of the yoke has a boss 36 extending to the left. As best shown in FIG. 3 (a top view), a set screw 37 is threaded into the boss 36. Four small Belville springs 38 bear against the friction disk 39. The set screw 37 provides the means for adjusting the drag of the yoke along the guide tube.

The clutch surface on each driving gear includes a cup member. The cup member 41 is attached to gear 12 by the key 42, and the cup member 43 is attached to gear 13 by the key 44. The cup member has a larger radius than the radius of the driving gear. Therefore, the clutch has greater torque capacity than would otherwise be provided by a clutch surface limited by the radius of the driving gear.

Consider the operation of the clutch. The clutch is in the neutral position as shown. When it is desired to shift the clutch into forward, the shift linkage is moved to the right. The flange 26 is pinched between the pin member 27 and leg 24 of the yoke. This pinching retards rotation of the clutch element 21. The threads 19 drive the clutch element 21 axially toward the right. The conical surface on element 21 engages the mating surface 14 of the cup member 41. Friction between the two mating conical surfaces drives the member 21 hard toward the right into firm mating engagement with the cup member 41. This drives the output shaft 17 in the forward direction. The motor torque is effectively used to drive the clutch element 21 to the right into firm mating engagement with the clutch surface of the cup member 41.

Antifriction bearings, such as Teflon coating or roller bearings, are inserted between the yoke and the flanges 25 and 26. Because of this, the tendency of the clutch element 20 to apply a counter axial force is reduced. This counter axial force would otherise counteract the axial force of element 21 driving the clutch elements toward the right. Clutch element 20 is free to counter-rotate as the elements 20 and 21 are driven toward the right. It can also be seen that the drag on the yoke is important. If the yoke freely moves to the right, a good pinching action between the yoke and the pin member is not obtained. It is this pinching action which slows rotation of the clutch element 21. A friction material may be added to the surface of the pin member 27 to increase the slowing of rotation of the clutch elements when engaged by pin member 27.

When the clutch is to be disengaged from the forward position, the clutch element 20 is frictionally held by moving the pin 27 toward the left. This pinches flange 25 between pin 27 and leg 23 of the yoke thereby slowing rotation of clutch element 20. The threaded engagement between the spiral threads 18 and the mating spiral threads on element 20 drives the clutch element 20 toward the left. This brings the element 21 along to the left, counter-rotating with respect to element 20 as it moves out of engagement with the bevelled gear 14. In this manner, the engine torque is effectively used to disengage the clutch as well as to engage it.

Shifting the clutch into reverse is effected in the same manner as previously described except that the pin 27 is moved toward the left from the neutral position.

Although a particular embodiment of the invention has been shown and described, it will, of course, be understood that various modifications may occur to those of ordinary skill in the art. The appended claims are, therefore, intended to cover all embodiments and modifications which fall within the true spirit and scope of the invention.

What is claimed is:

1. In a clutch mechanism of the type comprising:
   an input shaft having first and second oppositely threaded drive spiral threads thereon, an output shaft, forward and reverse driving gears rotatably mounted on said input shaft, each of said gears having a clutch surface, an output gear affixed to said output shaft and engaged with said driving gears, and first and second clutch elements each having threads which respectively match said first and second driving spiral threads, each having a clutch surface respectively mating with the clutch surface of said forward and reverse driving gears and each having a flange, an improved shifting mechanism;
   a yoke having two legs extending over the flanges on said clutch elements;
   a member movable axially by a shift linkage, said member engaging said first and said second clutch elements so that said axial movement of said member causes axial movement of said clutch elements;
   means for providing axial drag on said yoke so that axial movement of said member pinches a flange between said member and said yoke to slow down the rotation of said element on said input shaft whereby the spiral threads drive said element in the axial direction into clutch engagement or disengagement; and
   friction material on said member to increase the slowing of rotation of said clutch elements when engaged by said member.

2. The clutch mechanism recited in claim 1 wherein said shift linkage is contained in a guide tube, wherein said yoke has a projecting upper portion through which said guide tube extends, and wherein said means for providing drag includes screw means threaded in said upper portion and producing frictional engagement with said guide tube to provide said drag.

3. The clutch mechanism recited in claim 2 further comprising:
   a friction disc and springs between said screw means and said guide tube to provide an adjustable guide frag force.

4. In a clutch mechanism of the type comprising:
   an input shaft having first and second oppositely threaded drive spiral threads thereon, an output shaft, forward and reverse driving gears rotatably mounted on said input shaft, each of said gears having a clutch surface, an output gear affixed to said output shaft and engaged with said driving gears, and first and second clutch elements each having threads which respectively match said first and second driving spiral threads, each having a clutch surface respectively mating with the clutch surface of said forward and reverse driving gears and each having a flange, an improved shifting mechanism;
   a yoke having two legs extending over the flanges on said clutch elements;
   a member movable axially by a shift linkage, said member engaging said first and said second clutch elements so that said axial movement of said member causes axial movement of said clutch elements;
   means for providing axial drag on said yoke so that axial movement of said member pinches a flange between said member and said yoke to slow down the rotation of said element on said input shaft whereby the spiral threads drive said element in the axial direction into clutch engagement or disengagement; and
   a cup member attached to each driving gear, said cup member providing the clutch surface on each driving gear, each cup member having a larger radius than the radius of its driving gear, said larger radius providing increased torque capacity.

5. The clutch mechanism recited in claim 4 wherein said shift linkage is contained in a guide tube, wherein said yoke has a projecting upper portion through which said guide tube extends, and wherein said means for providing drag includes screw means threaded in said upper portion and producing frictional engagement with said guide tube to provide said drag.

6. The clutch mechanism recited in claim 5 further comprising:
   a friction disc and springs between said screw means and said guide tube to provide an adjustable guide drag force.

* * * * *